Patented Oct. 19, 1954

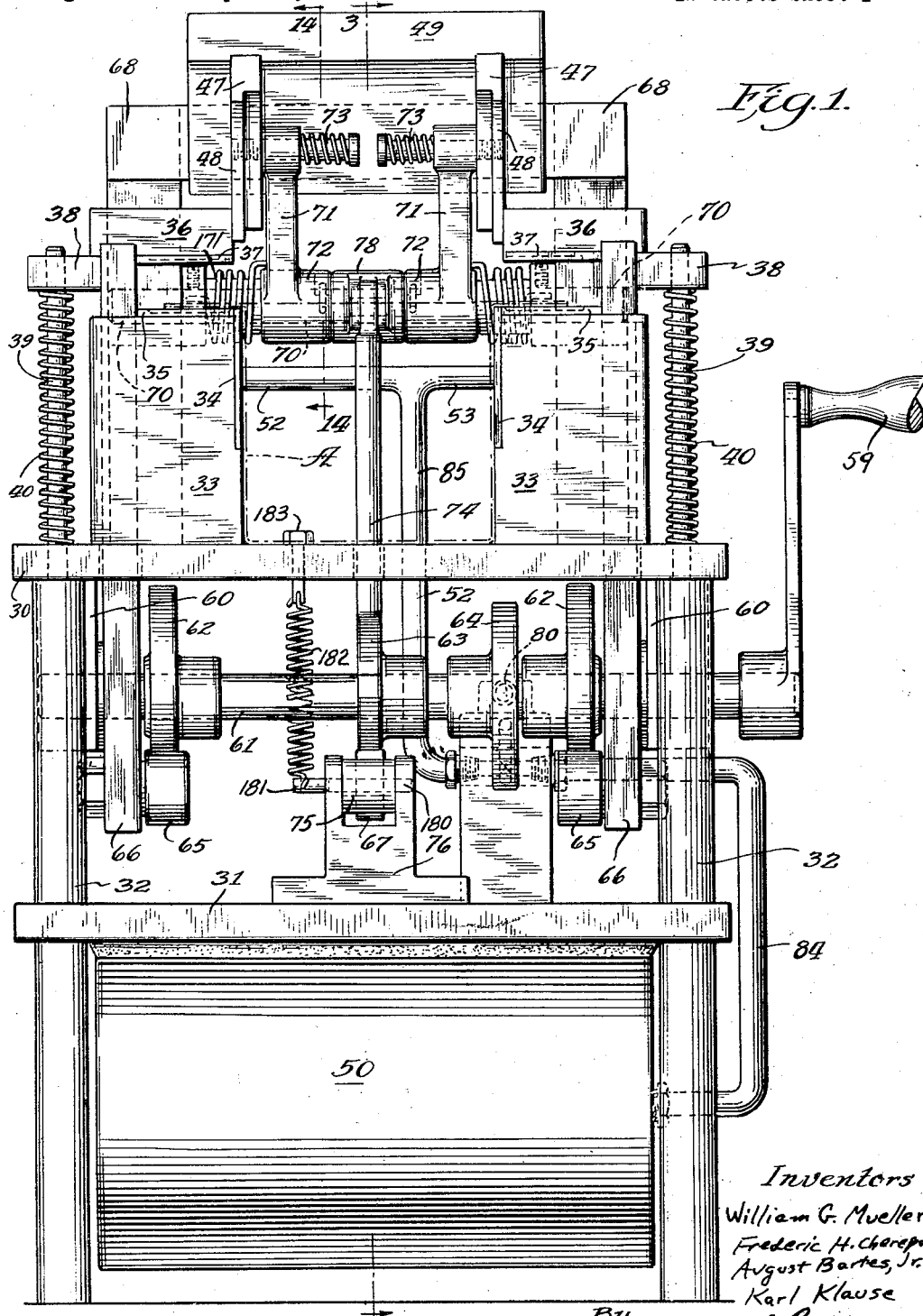

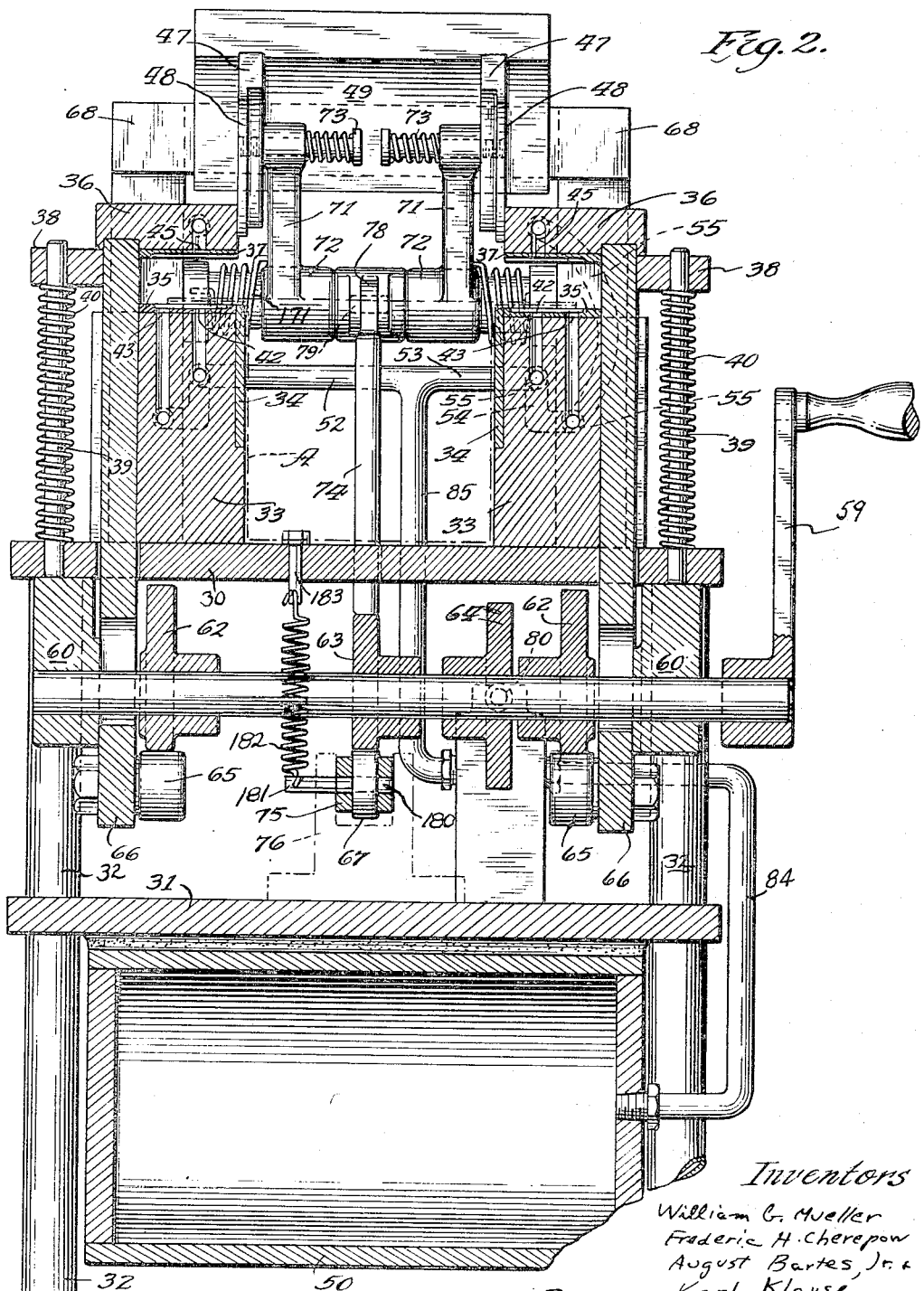

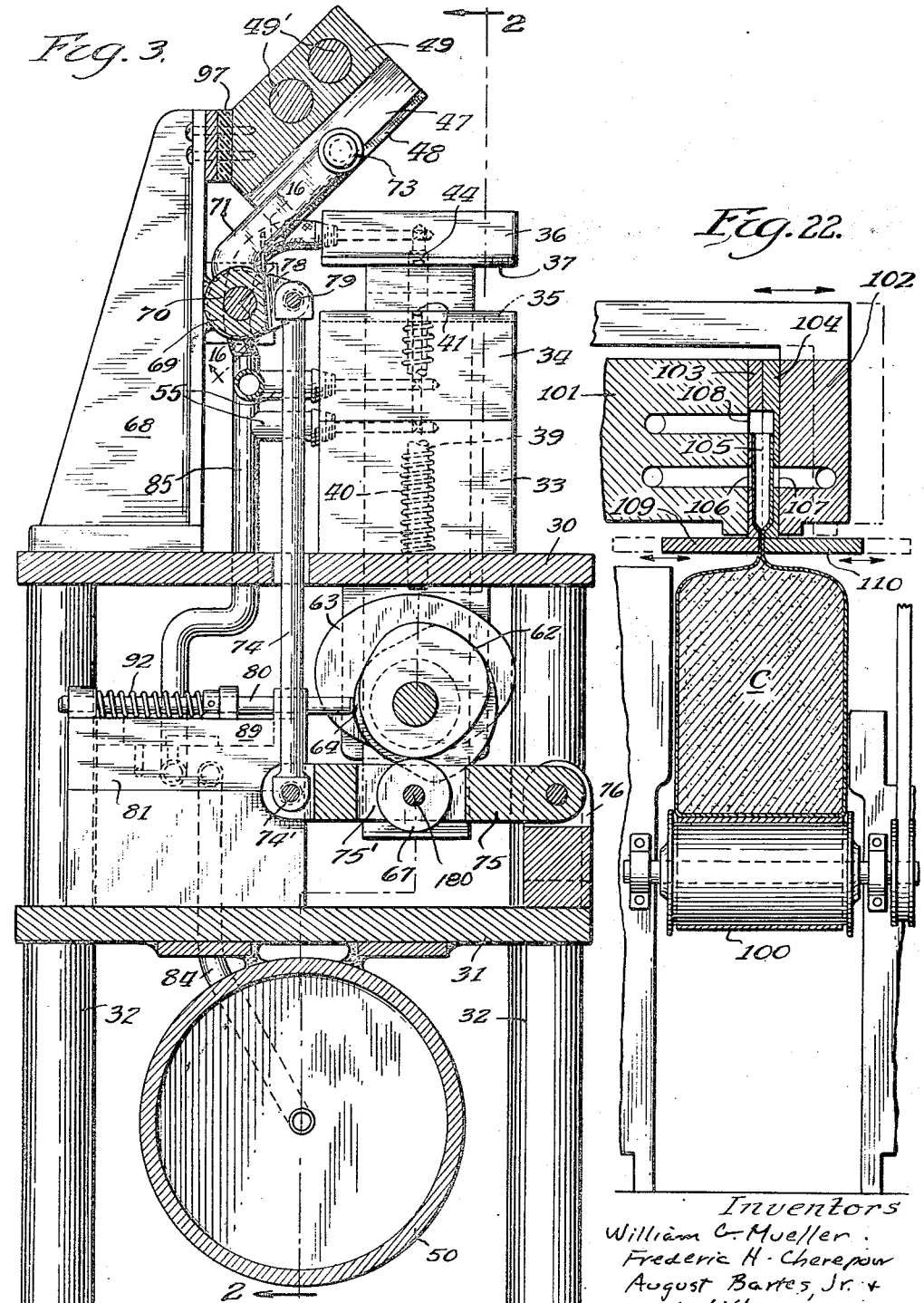

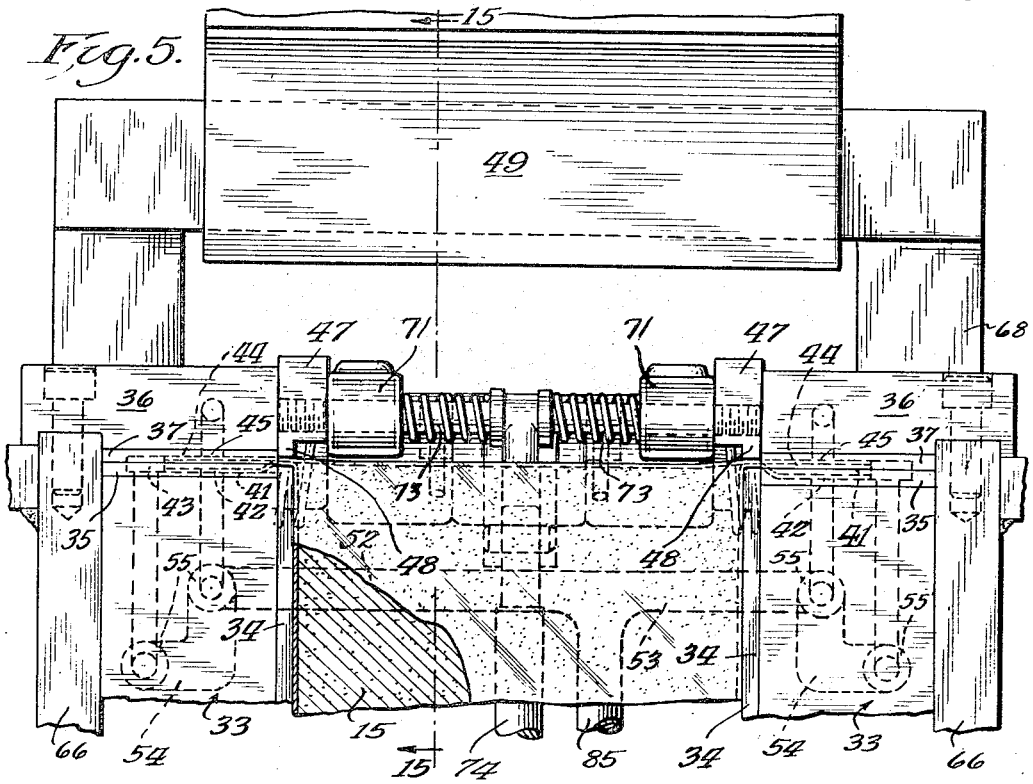
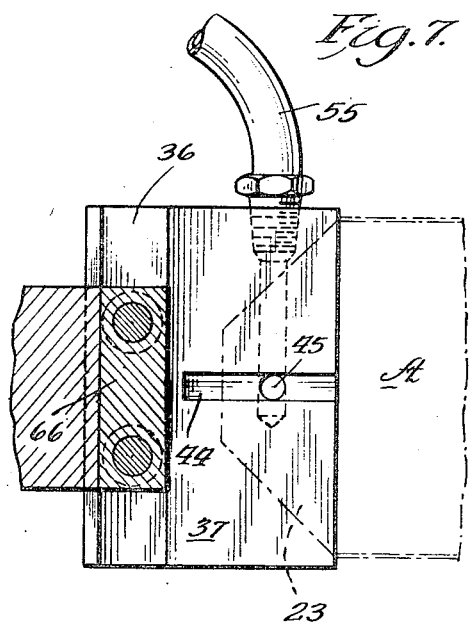
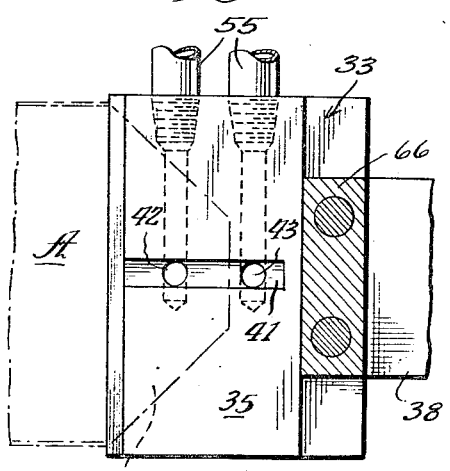

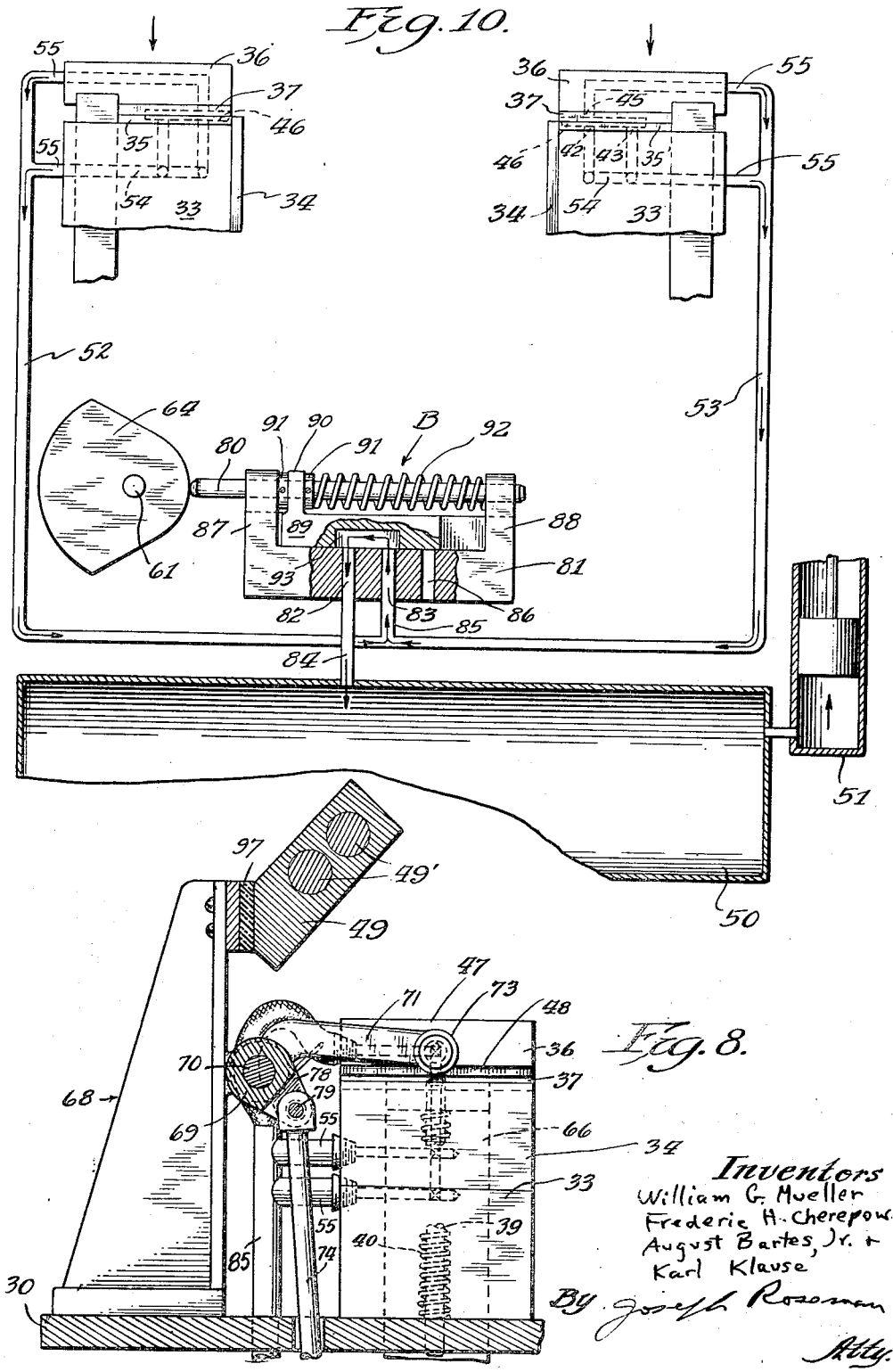

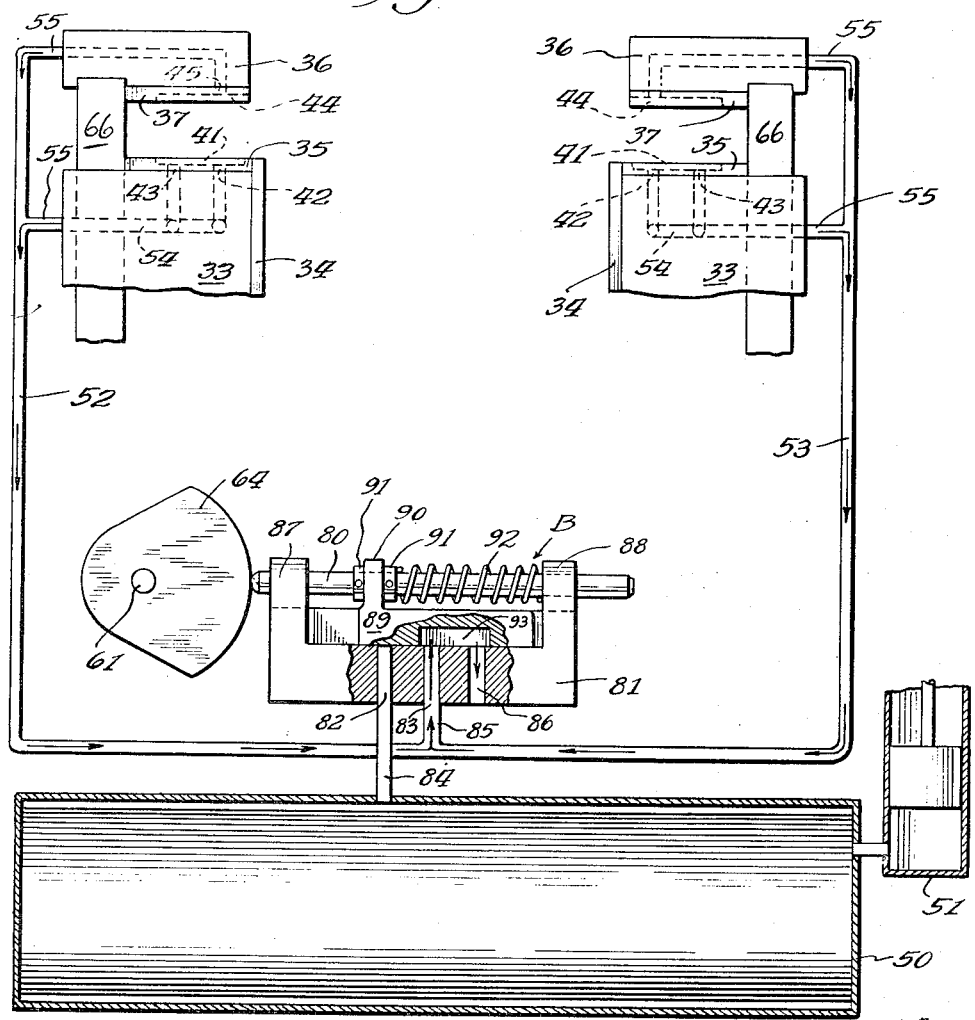
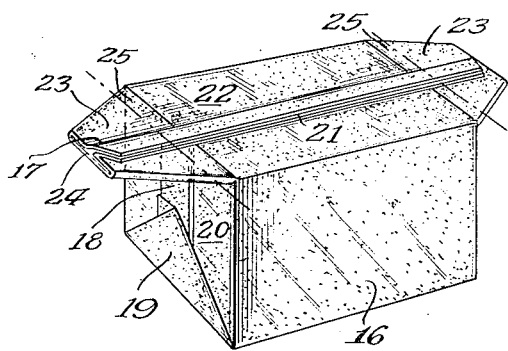
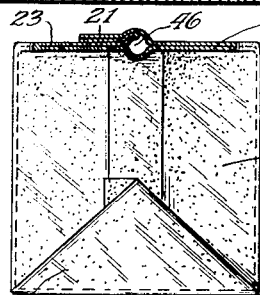

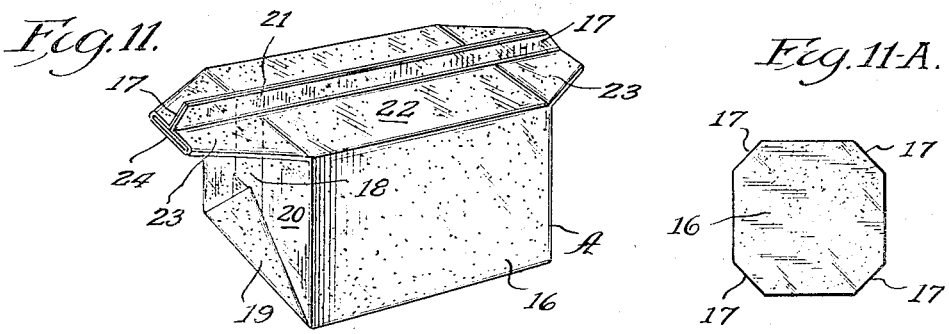
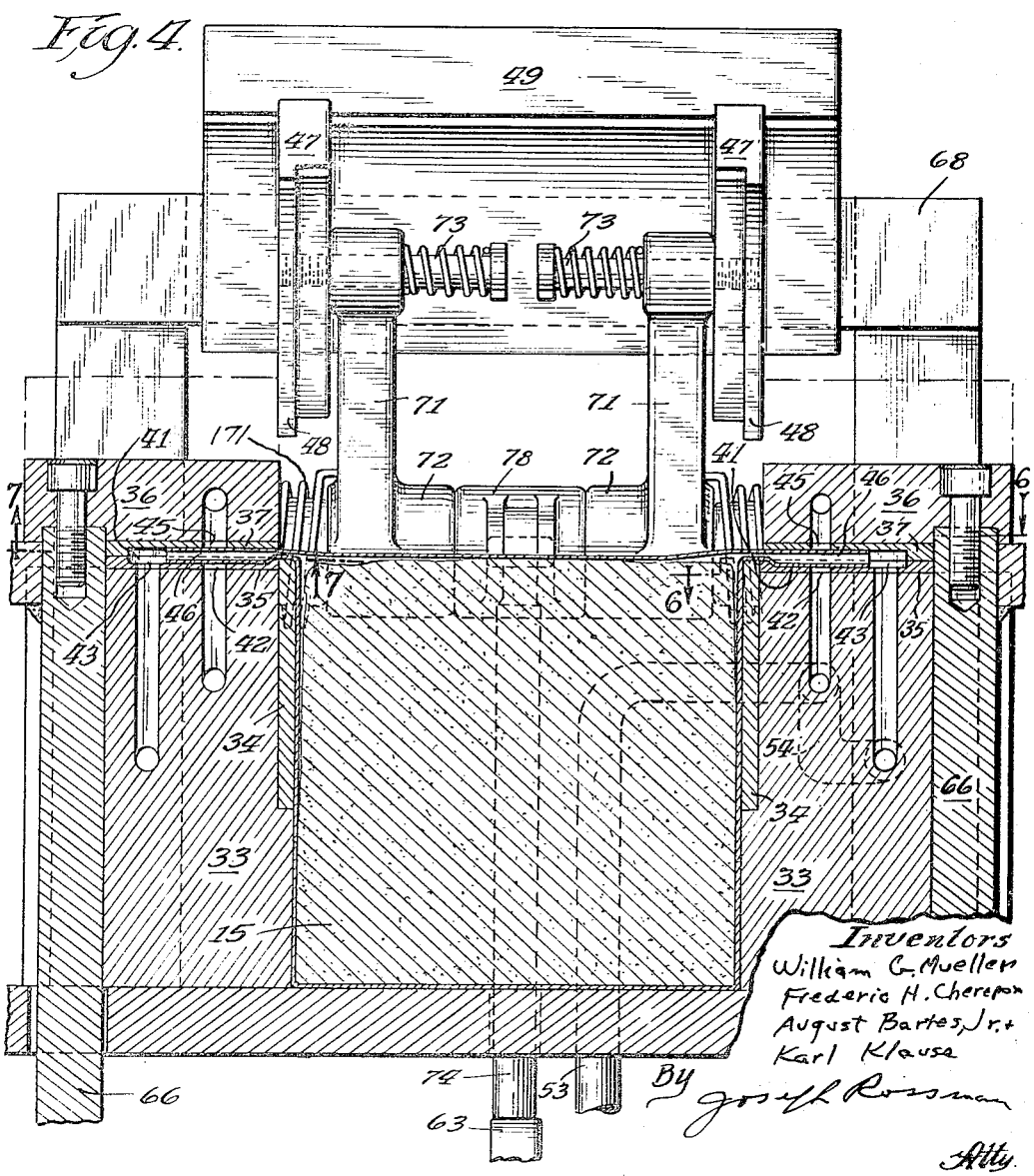

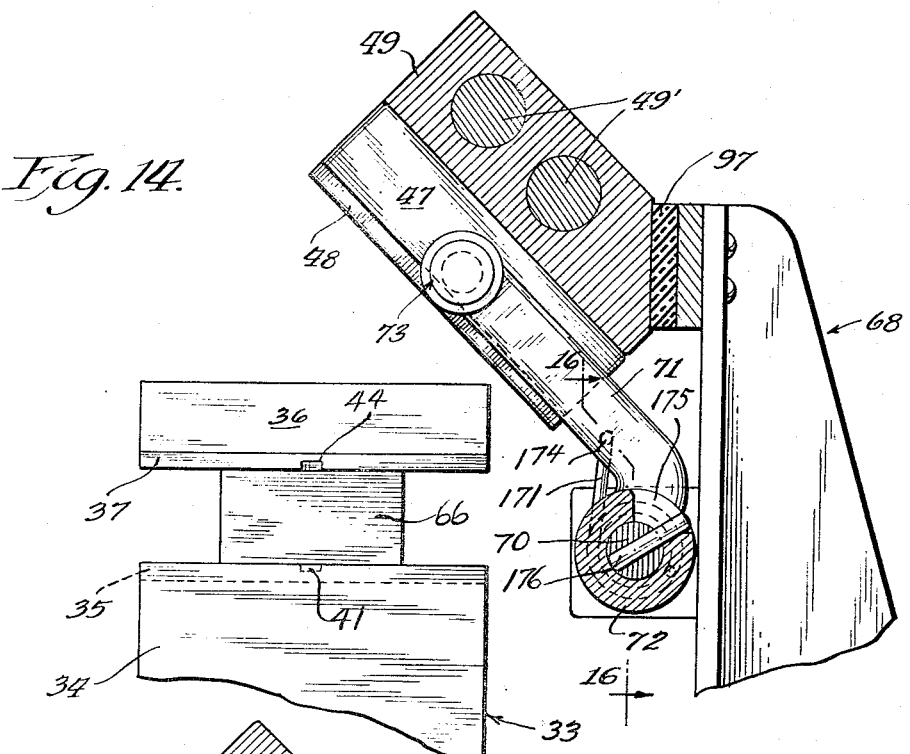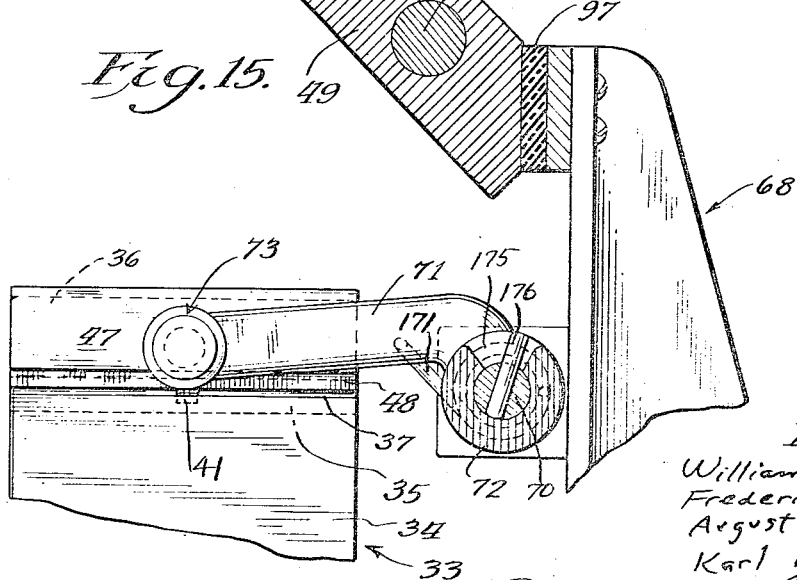

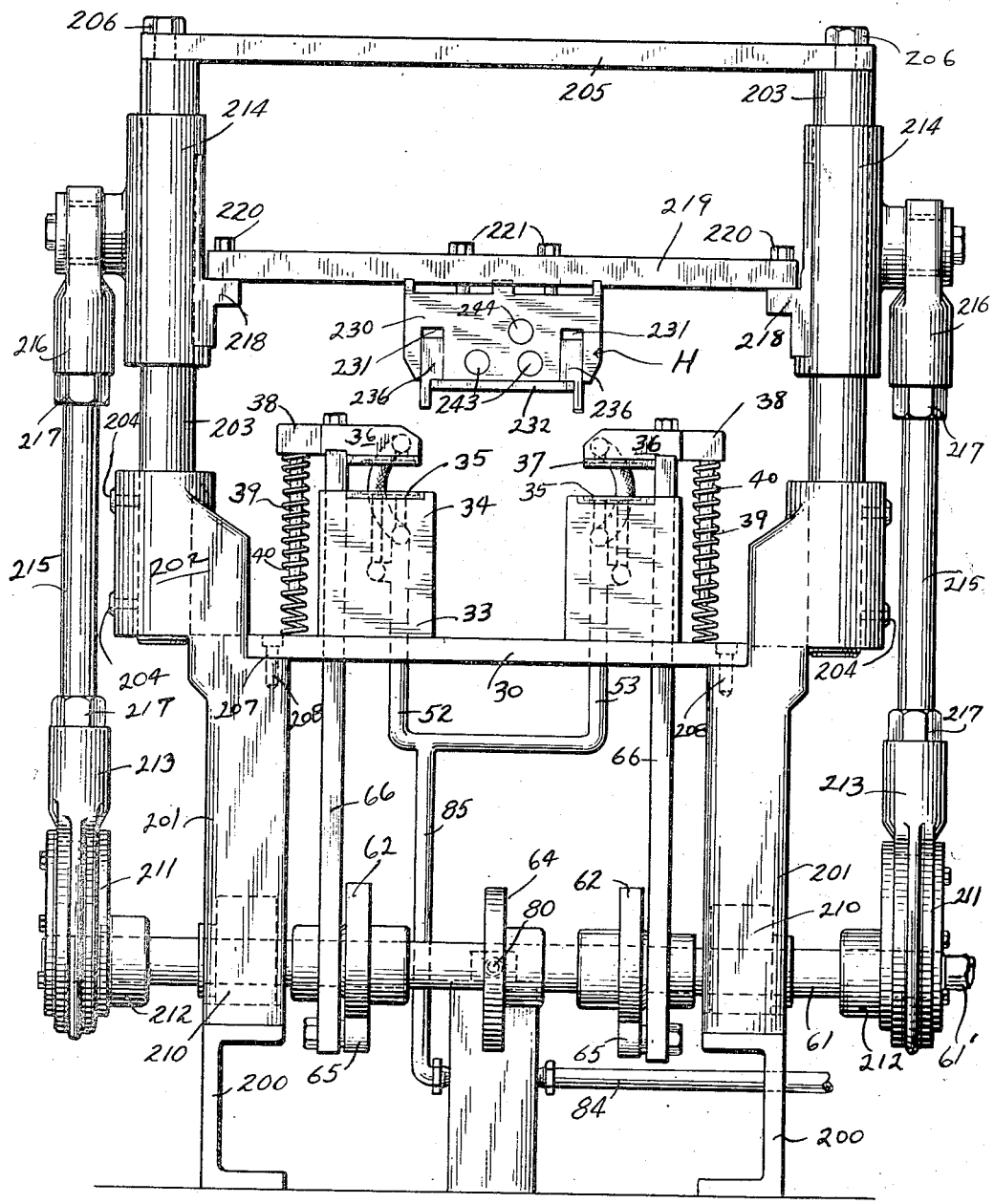

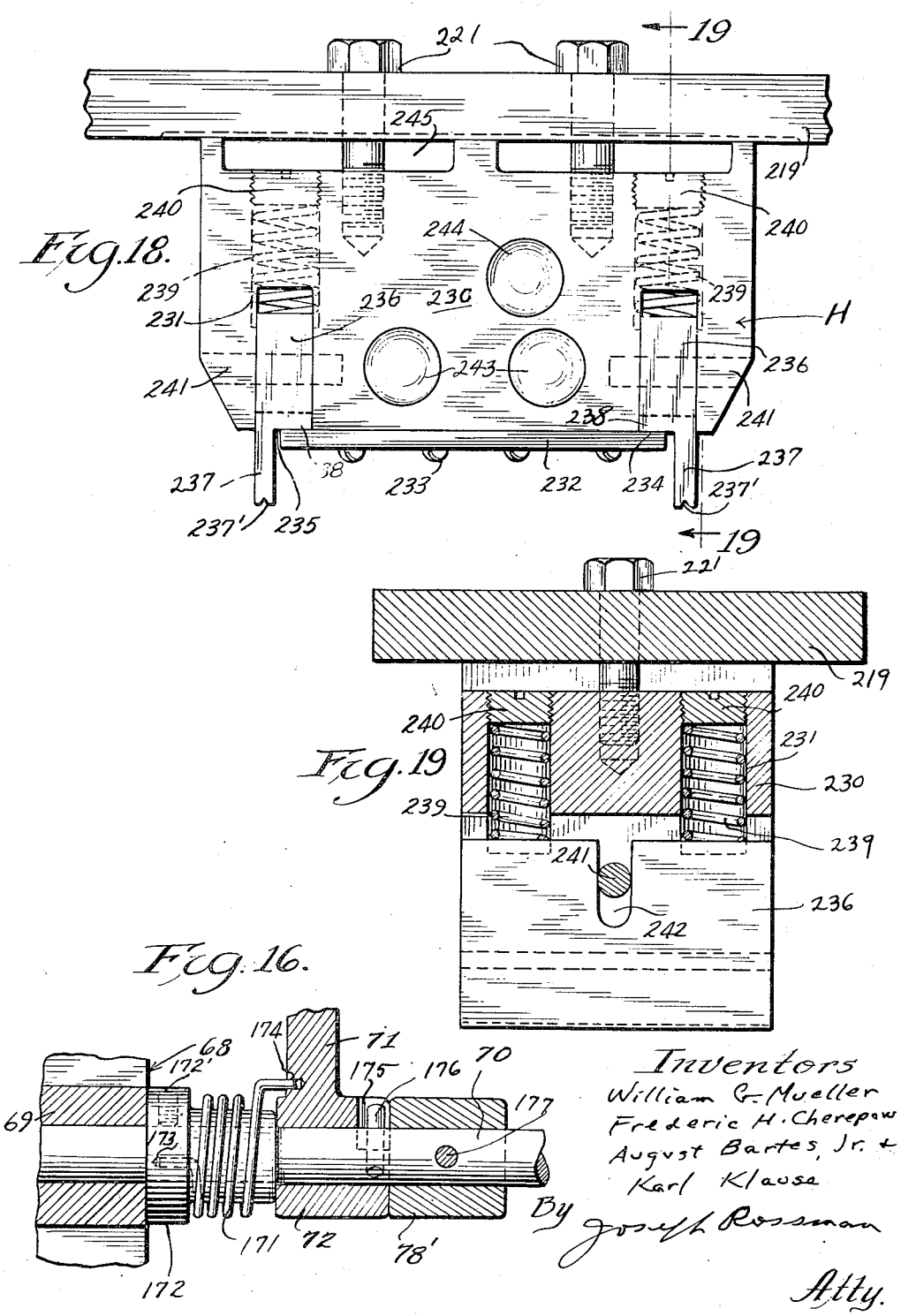

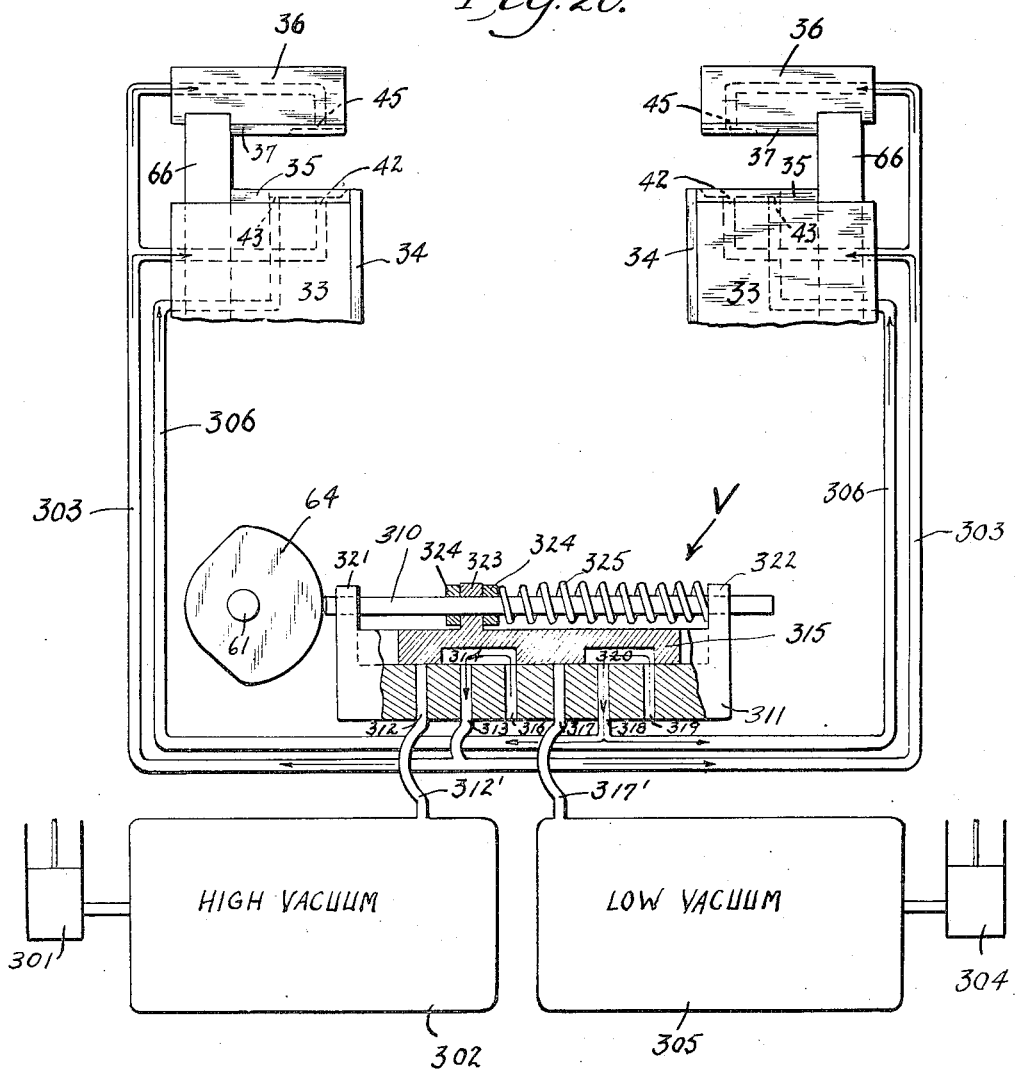

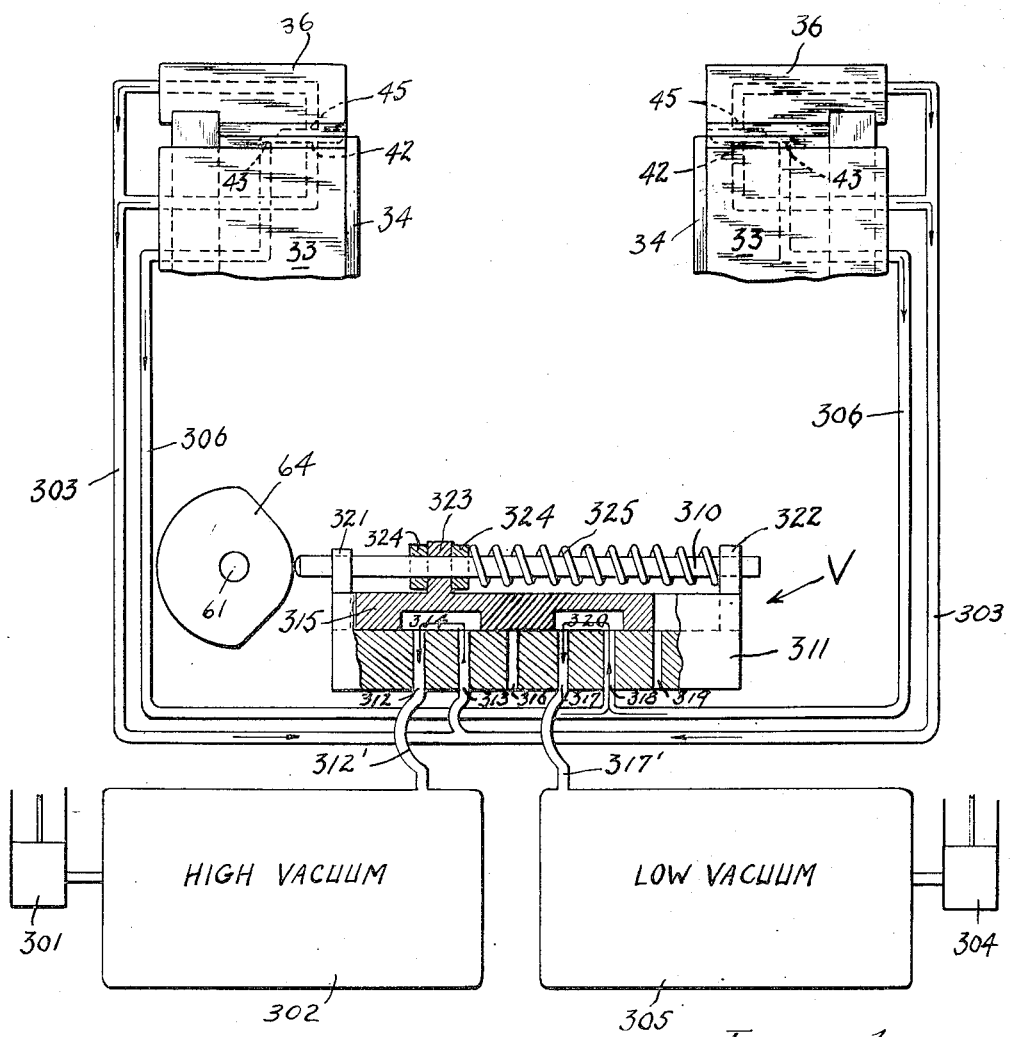

2,692,074

UNITED STATES PATENT OFFICE 2,692,074

APPARATUS FOR EVACUATING AND HEAT-SEALING PACKAGES

William George Mueller, Frederic Harold Cherepow, and August Bartes, Jr., Neenah, and Karl Klause, Appleton, Wis., assignors to Marathon Corporation, Menasha, Wis., a corporation of Wisconsin Original application September 19, 1947, Serial No. 775,076. Divided and this application August 14, 1952, Serial No. 304,312

10 Claims. (Cl. 226—56)

This invention relates to improved means for evacuating air or gases from a commodity-filled package and means for heat-sealing the package.

This application is a division of copending application 775,076, filed September 19, 1947, now U. S. Patent No. 2,634,562, April 14, 1953.

It is well known that many foods are deleteriously affected by the presence of air causing the formation of mold or other undesirable microorganisms. Heretofore, commodity-filled flexible containers have been air evacuated in vacuum chambers which required sealing the evacuated container while in the vacuum chamber. This procedure has not been commercially suitable because the operation is very slow and cumbersome. The vacuum chamber must be opened, the package placed therein, the vacuum applied, the package sealed and finally the vacuum chamber opened again to afford access to the sealed package. Furthermore, the sealing mechanism must be operated from the exterior of the vacuum chamber, thereby requiring gas-tight gasketing of the sealing members in the walls of the vacuum chamber.

The ideal method of vacuum packaging is one where the vacuum chamber is eliminated and the container evacuated in the atmosphere utilizing the container itself as the vacuum chamber. Prior art attempts to accomplish this have necessitated the use of nozzles or tubes connected to a vacuum source and disposed in the container opening or mouth, tightly clamping the flexible packaging material about the nozzle, applying the vacuum through the nozzle and sealing the container below the area of clamping. Such procedures have resulted in an undesirable stretching and distortion of the packaging material in the area where it is clamped about the nozzle. By our method and means a flexible commodity-filled container is evacuated of the undesirable gases or air and sealed in the atmosphere without the use of a nozzle. The procedure is simple, quick and results in an air or gas evacuated sealed package of superior quality.

The primary object of the invention is to produce a package which may be quickly and easily fabricated and which will constitute a hermetically sealed, commodity-filled, flexible container from which undesirable air or gases have been removed so that the commodity is effectively preserved.

Another object of the invention is to evacuate the air or gases from a commodity-filled flexible container and seal the container in the atmosphere without the use of a nozzle or tube which tends to distort the packaging material.

Other objects and advantages will more fully appear from the description and drawings, wherein:

Figure 1 is a front view of one type of machine construction showing the clamping jaws and sealing bars retracted, Figure 2 is a front vertical section of the machine taken along line 2—2 of Figure 3, Figure 3 is a vertical side section taken along the line 3—3 of Figure 1, Figure 4 is a front vertical section illustrating the packaging material clamped between the jaws and the vacuum being applied only to the ear portions but prior to the evacuation of the package, Figure 5 is a front view partly in section showing the sealing bars applied to areas of the packaging material to seal the gas or air evacuated package, Figure 6 is a plan view of one clamping surface taken along the line 6—6 of Figure 4 with the packaging material indicated in phantom lines, Figure 7 is a plan view of a clamping surface taken along the line 7—7 of Figure 4 which cooperates with the clamping surface shown in Figure 6, the packaging material also being indicated in phantom lines, Figure 8 is a side view of the sealing and evacuating head, Figure 9 is a diagrammatic view of the vacuum system when the clamping jaws are retracted and no vacuum is being applied, Figure 10 is a diagrammatic view of the vacuum system illustrated in Figure 9 when the jaws are in clamping position and the vacuum is being applied to and within the package, Figure 11 is a perspective view of a package construction which may conveniently be evacuated and sealed by means of our invention, Figure 11-A is a plan view in reduced scale of the blank constituting the packaging material, Figure 12 is a perspective view of the evacuated and heat-sealed package, Figure 13 illustrates the package partly in section to show how a channel is formed in the eared portion of the package when the vacuum is being applied by the means of our invention, Figure 14 is a vertical section taken along the line 14—14 of Figure 1, illustrating the sealing means retracted and in contact with a heater block, Figure 15 illustrates the heated sealing means in downward position and acting upon the packaging material to form a seal, Figure 16 is a section taken along the line 16—16 of Figure 14 illustrating in detail the manner in which the sealing means is mounted, Figure 17 is a front view of a modified form of our invention wherein a reciprocating sealing head is used in lieu of the pivoted type, Figure 18 is an enlarged front view of the heated sealing head used in the mechanism shown in Figure 17, Figure 19 is a vertical section taken along the line 19—19 of Figure 18, Figure 20 is a diagrammatic view of a modified form of vacuum system wherein two vacuum tanks are utilized, this view illustrating the system when the jaws are retracted and no vacuum is being applied, Figure 21 is a diagrammatic view of the modified vacuum system illustrated in Figure 20 when the jaws are in clamping position and the vacuum is being applied to the packaging material and within the package, and Figure 22 illustrates another form of the invention when an ordinary filled flexible bag is being evacuated of its gases or air.

The apparatus shown in Figures 1 to 21 is particularly adapted for operation upon a package of the type shown in Figures 11, 12 and 13, the subject-matter of the Frank A. Palmer Patent No. 2,274,344, February 24, 1942. However, our invention may be used for evacuating and sealing other types of packages, such as, for example, disclosed in Gardner Patent No. 2,382,987, August 21, 1945.

Referring to Figures 11 and 12, a package A comprising a commodity 15 (see Figures 4 and 5), which may be cheese or other foodstuff, is enveloped in a blank 16 of packaging material. The packaging material is preferably an inherently thermoplastic moistureproof sheet, such as rubber hydrochloride or a flexible base sheet of regenerated cellulose, paper, glassine, etc. coated on the surface, which will be adjacent the commodity, with a suitable thermoplastic composition. If the base sheet does not possess adequate gas or air impermeability properties, such properties may be supplied by the proper selection of the thermoplastic coating composition. The flexible packaging material may also be constituted of suitable laminates of non-thermoplastic and thermoplastic sheets or non-thermoplastic sheets bonded together with a surface of the laminate coated with a suitable heat-activatible coating composition. The blank 16, preferably has its corners diagonally cut at 17 as shown in Figure 11-A. The commodity is enveloped in the blank 16 and has its side margins on each end of the package folded and heat-sealed in face-to-face relationship resulting in the formation of a fin 18 and an eared portion 19 on each side 20 of the package. The fins 18 and the eared portions 19 are folded into contact with their respective side walls 20. The blank 16 is folded at the upper marginal areas 21 so that they are in face-to-face relationship and heat-sealed across the entire top surface 22 of the package. This folding and sealing operation results in the formation of eared portions 23 at each end and extending beyond the main body portion of the package. At the extreme edge of each eared portion 23, there is an opening 24 as shown in Figures 11 and 12 which leads into the interior of the package. But for these openings 24, the package is completely sealed. This stage of the packaging operation is illustrated in Figure 11. The fin resulting from the sealing of the margins 21 is then folded down in contact with the top surface 22 of the package as shown in Figure 12. Vacuum is then applied to openings 24 to remove air from the package and then the areas 25 adjacent the main body of the package are heat-sealed.

Referring to Figures 1 to 10, wherein like numerals refer to like elements, one form of the apparatus for evacuating the gases or air from within a package of the type hereinbefore described comprises spaced horizontal supporting plates 30 and 31 suitably secured to spaced supporting rods 32 to form a unitary frame structure. Fastened to the supporting plate 30 are a pair of spaced blocks 33. The blocks 33 are spaced apart a distance to accommodate the package A. The distance between them may be made adjustable by any suitable means to accommodate packages of various sizes. Secured to the inner face of each block 33 is a metal sealing plate 34. If desired the plate 34 may be made integral with its block 33. The top surface of each sealing block 33 has adhered thereto a clamping member 35 of resilient material such as rubber. It will be noted that each clamping member 35 abuts the upper portion of the sealing plate 34 so that the upper horizontal edge of the sealing plates are exposed and flush with the top surface of the resilient clamping members.

A pair of movable jaws 36 are provided to cooperate for clamping engagement with the resilient material covered faces of each of the spaced blocks 33. The jaws 36 are similarly covered with clamping members 37 of resilient material such as rubber. When the jaws 36 are in engagement with their blocks 33 the upper edges of the plates 34 are exposed. The jaws 36 each have a lateral extension 38. The extension 38 is provided with a vertically disposed opening therein which receives a rod 39 secured to the plate 30. The rod 39 is encircled with a helical compression spring 40. The springs 40 have their lower ends abutting the plate 30 and the under surface of their respective extensions 38. The springs serve to maintain the jaws 36 in their uppermost or inoperative positions.

As shown in Figures 6 and 7 the clamping member 35 of the block 33 has formed therein a groove 41 in the base of which are openings 42 and 43. The clamping member 37 of the cooperating jaw 36 has a groove 44 in the base of which is an opening 45. When the jaw 36 and the block 33 are in clamping engagement, the grooves 41 and 44 coincide to form a passageway for shaping a channel portion 46 in the ears of the package as shown in Figure 13. The groove 41 extends longitudinally from the edge of the block 33 which is adapted to contact the package to a point inward of the other parallel side of the block 33. The grooves 41 and 44 also extend beyond the free end of the ears of the package. It will be noted that there is a large and substantial clamping surface area extending laterally on both sides of the grooves 41 and 44 so as to assure complete gas-tight sealing action to be later explained. When the jaws 36 are in clamping engagement with blocks 33 the grooves 41 and 44 in each pair of resilient clamping members 35 and 37 are aligned in mating relation to form passageways which function in a manner to be described later.

A pair of heat-sealing bars 47 having narrowed portions 48 of substantially the same width as the thickness of the plates 34 are adapted to cooperate with the upper horizontal edges of the sealing plates 34. The sealing bars 47 are heated by conduction and are retractable in unison to contact a heater block 49. The thickened portions of sealing bars 47 are for the purpose of presenting a greater absorbing area to the heater block 49. The heater block 49 has disposed therein heater elements 49' which may be electrical resistances connected to a suitable source of current. The heater block 49 is fixedly mounted on a supporting stand 68 and suitably insulated therefrom by a layer of insulating material 97.

A vacuum tank 50, which is connected to a cylinder 51 of an evacuating pump, is suspended from the frame plate 31. The openings 42, 43 and 45 in their respective grooves in the clamping members 35 and 37 of blocks 33 and jaws 36 are connected to the vacuum tank by means of primary pipe lines 52 and 53 and secondary lines 54 and 55. The vacuum system will subsequently be described in detail.

Mounted in the frame of the machine are spaced bearings 60 in which is journalled a shaft 61, one end of which is secured to a handle 59 to permit the shaft to be rotated. Fixed to the shaft 61 for rotation therewith are a pair of spaced jaw actuating cams 62, a sealing cam 63 and a vacuum cam 64.

The jaw actuating cams 62 are adapted to cooperate with jaw cam followers 65 rotatably mounted at the lower ends of jaw slide bars 66. The jaw bars 66 are secured at their other extremities to their respective jaws 36 and will reciprocate though openings provided in the plate 30.

The sealing cam 63 is mounted for cooperation with a sealing cam follower 67 which is part of a linkage connected to the sealing bars 47 to be subsequently described in detail. A stand support 68 is fixed to the frame plate 30 with spaced bearings 69 welded to its vertical face. A shaft 70 is journalled in the bearings 69. A pair of spaced lever arms 71 are rotatably mounted on shaft 70 by means of collar portions 72 which preferably are integral with the lever arms. The collars 72 are rotatable on the shaft 70. The other end of each lever arm 71 has mounted thereon a sealing bar 47. Preferably, the sealing bars 47 are resiliently mounted on their respective lever arms by spring mounted pins 73. In this manner each sealing bar is permitted a slight amount of lateral play with respect to its supporting lever arm.

As shown in detail in Figures 14, 15 and 16, a torsion spring 171 encircles a sleeve of a spring retaining collar 172 intermediate said collar and the collar 72 of the lever arm 71. The collar 172 is fixed to the shaft 70 for rotation therewith by a set screw 172'. One end of the spring 171 is secured to the collar 172 at 173 and the other end to the lever arm 71 at 174. This construction is duplicated for the other lever arm 71. The lever arm collars 72 are each cut away or recessed at 175 to receive a pin 176, which is fixed to the shaft 70. The pins 176 serve to limit the amount which the lever arm collars 72, and hence each lever arm 71, may rotate about the shaft 70.

A sealing bar tie rod 74 is secured to one end of a lever 78 by a pin 79. The other end of the lever 78 has a collar portion 78' encircling the shaft 70 and fixed thereto by a pin 177 so that movement of the lever 78 will rotate the shaft. The lever 78 is thus fixedly mounted on the shaft 70 intermediate the pair of lever arm collars 72. As shown in Figure 3, the lower end of the tie rod 74, which passes through an opening in the plate 30, is pivoted on a pin 74' to one end of a lever arm 75 fulcrumed in a pivot bracket 76 which is fastened to the frame plate 31. The lever arm 75 is slotted at 75' to receive the cam follower 67 mounted for rotation on a pin 180. As shown in Figures 1 and 2, a tension spring 182 has one end thereof connected to an extension 181 of the pin 74' and the other end anchored to a bolt 183 extending through the frame plate 30. The tension spring 182, through the tie rod 74, serves to urge the sealing bars 47 rearward into inoperative position where the sealing bars are maintained in engagement with the heater block 49.

Downward motion imparted to the lever arm 75 by the action of the cam 63 upon the cam follower 67 will cause the tie rod 74 to move downward against the force exerted by the tension spring 182 and rotate the shaft 70 through the lever 78. Upon turning the handle 59 clockwise, the shaft 70 through the linkage described is rotated causing the spring retaining collars 172 to rotate therewith. Since the torsion springs 171 are fixed to the collars 172 and the lever arms 71, the sealing bars 47 resiliently carried by the latter, are caused to be articulated downwardly, independently of each other. The narrowed portions 48 of the sealing bars 47, in conjunction with the sealing plates 34, heat and press the packaging material at the desired zones. When the heat sealing bars 47 are fully down, the pins 176 do not exert any pressure on their respective lever arms 71 so that the torsion springs 171 can each exert its full force in applying further sealing pressure to the sealing bars. On further rotation of the handle 59, the pin 176 contacts its lever arm and in conjunction with the action of the spring 182, which maintains the cam follower 67 against the cam 63, the sealing bars are returned to their upward inoperative position in contact with the heater block 49. Furthermore, the limiting pins 176, the recesses 175 and the torsion springs 171 are so designed and arranged that the sealing bars 47 would normally overtravel were it not for the intervening plates 34. Thus, the sealing of both eared portions of the package is carried out simultaneously by the application of independent, resilient sealing pressures.

The vacuum cam 64 controls the vacuum system. Cam 64 is mounted to bear against a regulating plunger 80 of a valve mechanism B, Figures 9 and 10. The valve mechanism B comprises a stationary block 81 having an inlet port 82 and an outlet port 83. The inlet port 82 is connected to the vacuum tank 50 by a line 84. The outlet port 83 is connected to the lines 52 and 53 by the line 85. A third portion is provided for release purposes and to bleed off the residue of air or gas in the vacuum system. The stationary block 81 possesses extensions 87 and 88 having openings therein to journal the slidable regulating plunger 80. A movable block 89 is disposed on the stationary block 81 between the extensions 87 and 88 and is in tight sliding engagement with the stationary block 81. The block 89 has an extension 90 through which the plunger 80 passes. The extension 90 is fixed to the plunger 80 by means of suitable collars 91. A helical spring 92 is disposed about the plunger 80 with one end bearing against the extension 88 of the stationary block 81 and the other against a collar 91 which fixedly fastens the movable block 89 to the plunger 80. A channel 93 is formed on the side of the slidable block 89 adjacent the stationary block 81. The channel 93 is designed so that it will cover but two ports;

that is, either inlet and outlet ports 82 and 83 or outlet port 83 and the release port 86.

A single cycle operation of the above described apparatus occurs as follows: The package A is positioned between the blocks 33 with the eared portions 23 resting upon the upper resilient clamping members 35. The arrangement of the mechanism at this stage is illustrated in Figures 1, 2, 3 and 9. The handle 59 is grasped and turned, whereupon the shaft 61 is rotated. Rotation of the shaft 61 will cause the jaw actuating cams 62 to depress their respective cam followers 65 resulting in the jaws 36, through the slidable jaw bars 66, to come down and firmly clamp the eared portions 23 of the package A, as shown in Figure 4. Clamping members 35 and 37 clamp the eared portions in an air and gas-tight seal. As the shaft 61 is further rotated the vacuum cam 64, which hitherto had displaced the plunger in the position shown in Figure 9, permits the spring mounted plunger 80 to assume the position shown in Figure 10. This movement causes the channel 93 of the sliding block 89 to straddle the ports 82 and 83. The result is to connect the vacuum source 50 to the channels 46 formed by the grooves 41 and 44 in each pair of clamping surfaces.

As indicated in Figures 4, 5, 6, 7 and 10, the openings 42 and 45 are so located that portions of the plies of packaging material in the eared portion 23 are pulled out of their flat position into the adjacent grooves 41 and 44 and retained therein by the acting vacuum so that a channel 46 is formed in the eared portions of the packaging material conforming to the passageway formed by the coincident grooves 41 and 44. This is shown in Figure 13. The grooves 41 and 44 are dimensioned so that the eared portion 23 covers the openings 42 and 45 but does not cover the opening 43. The result is that air or gas within the package is evacuated through the channel formed in the packaging material by the suction operating through the opening 43. This is accomplished while the plies of the eared portion 23 are under a gas-tight seal resulting from the tight clamping action of the jaw 36 with respect to its clamping block 33.

After a suitably timed interval, depending upon the amount of pressure reduction being used in the vacuum system, the further rotation of the shaft 61 causes the sealing cam 63 to depress the cam follower 67 which through its associated linkage results in the heat-sealing bars 47 being articulated downwardly to clamp the ear areas 25 adjacent the main body of the package between bars 47 and sealing plates 34. This action serves to heat-seal the heat-activatible material constituting the plies of the packaging material in the areas between the sealing plate 34 and the narrowed portion 48 of the sealing bar 47. The sealing force applied by heat-sealing bars 47 in effect cuts across the vacuum exerted through opening 46, closing this opening and completing the seal of the evacuated package.

Preferably the sealing cam 63 and the vacuum cam 64 are cut or formed so that the sealing bars are retracted before the vacuum is cut off. The differential between the vacuum pressure and the atmospheric pressure will serve to set and cool the heat and pressure-sealed areas of the package. When the vacuum is cut off, the system has normal atmospheric pressure reestablished therein by the entrance of atmospheric air through release port 86, the plunger 80 having been moved by the cam 64 to the position shown in Fig. 9. Finally, the jaws 36, due to the continued rotation of the jaw cams 62, are retracted permitting the removal of the air or gas evacuated heat-sealed package.

The operation outlined above is accomplished by one complete revolution of the shaft 61 due to the manner in which the jaw, sealing and vacuum cams and their respective linkages are designed. Summarizing, the preferred sequence of operations is as follows: The ears of the package are clamped between the jaws; the vacuum is applied to open a channel in each ear and simultaneously the vacuum is applied to evacuate air or gases from within the package; the package is heat-sealed; the heat-sealing means are removed while the vacuum is still on; the vacuum is cut off; the clamping jaws are opened and the gas or air evacuated heat-sealed package removed from the machine.

By means of the apparatus described, a hermetically sealed package containing, for example, cheese is formed which is evacuated of the normally entrapped air. The elimination of air in the package serves to preserve the cheese since air promotes the growth of mold and other microorganisms. Furthermore, the removal of air or gases within the container is greatly facilitated by the method or means of our invention.

It is evident that instead of evacuating a package through both eared portions as described, the package may be sealed throughout but for the opening in the extremity of one eared portion. It is then only necessary to use one pair of clamping surfaces, one of the two sealing bars and, of course, eliminate the vacuum lines leading to the unused pair of clamping surfaces.

Figures 17, 18 and 19 illustrate another embodiment of our invention wherein a reciprocating type of heat sealing head is used in lieu of the pivoted or articulated sealing bars as hereinbefore described. The clamping mechanism and the vacuum system as well as their actuating mechanisms are substantially unchanged so that like numerals indicate identical elements heretofore described.

The apparatus comprises spaced beams 200 upon which are supported vertically disposed frame members 201 each having formed at its upper end a hollow collar 202. Each collar 202 receives a guide rod 203 which is fixed at one end within the hollow collar 202 by the bolts 204. The guide rods 203 are maintained in fixed spaced relationship by a cross bar 205 bolted to them at 206. The frame members 201 are each provided with a shoulder 207 to which a horizontally disposed frame plate 30 is secured by the bolts 208.

Upon the plate 30 are fastened the spaced blocks 33 for cooperation with the clamping jaws 36 having the construction heretofore described. Instead of fixing the rods 39 to the plate 30 as heretofore described, the rods 39 may be of shorter length and secured to the extensions 38 with the encircling springs 40 serving to maintain the jaws 38 in their uppermost or inoperative position, as shown. The clamping surfaces 35 and 37 are the same as described and connected to the previously described vacuum system.

The shaft 61, journalled in bearings 210 provided in the frame members 201, is connected at one end 61' to a suitable source of power (not shown). The shaft 61 may be rotated automatically at any desired speed and in timed relation to the positioning of individual packages between the blocks 33 by an automatic conveying means. The shaft 61 has mounted thereon the jaw actuating cams 62 and vacuum cam 64 for the purposes heretofore described.

A reciprocating head H is provided to perform the heat sealing function. By this construction the area between the blocks 33 is unobstructed to thereby allow a conveyor to carry the packages into and out of operating position automatically. To operate the reciprocating heat sealing head H in proper timed relation with respect to the clamping and evacuating operations, eccentrics 211 are mounted on the shaft 61, one on each side of the machine. The eccentrics 211 are fixed to the shaft 61 by collars 212. The eccentrics 211, provided with inner threaded members 213, are connected to sleeves 214 slidable on the guide rods 203, by connecting rods 215 which are threaded at each end. The sleeves 214 are provided with members 216 which are threaded on their inner surfaces. By adjusting the threaded connecting rods 215 within the threaded members 213 and 216 and locking them into fixed position by nuts 217, the position of the stroke may be adjusted as desired. The sleeves 214 have formed thereon shoulders 218 which have fastened thereto a sealing head supporting plate 219 by bolts 220. The sealing head H is secured to the lower side of the plate 219 by bolts 221.

The sealing head H comprises a metal block 230 formed with spaced recesses 231 opening on the bottom of the block. The bottom surface of the block 230 has fastened thereto a plate 232 by screws 233. The plate 232 is dimensioned so that marginal portions thereof 234 extend over and cover a part of the opening provided by each recess 231. The uncovered portions of the recesses 231 are designated 235. Sealing bars 236 having portions of reduced thickness 237 are disposed within the recesses 231 with the portions 237 extending through the openings 235. The working face of the sealing bars may be channeled as at 237'. The portions 237 are of lesser width than the openings 235 through which they extend. Shoulders 238, resulting from the described configuration of the sealing bars 236, are adapted to rest upon the marginal portions 234 of the plate 232. The main body or thickened portions of each sealing bar 236 possesses a thickness slightly less than the width of the recess 231 in which it is disposed. The rear face of each sealing bar 236 has seated thereon the ends of a pair of springs 239. A nut 240 is threaded within the upper end of each recess 231 to close it off and serve as means for suitably adjusting the pressure upon the springs 239 and its sealing bar 236. Horizontally disposed pins 241 are fixed in the block 230 and extend across the recesses 231 for cooperation with a vertical slot 242 in each sealing bar 236. This slot and pin arrangement permits suitable radial and vertical compensation or adjustment of the sealing bars and also serves to limit the upward movement of the sealing bars. Heater units 243 and a heat control unit 244 are set in the block 230 and act to heat the working faces 237' of the sealing bars 236 by conduction. The block 230 is recessed adjacent the plate 219 at 245 to minimize the loss of heat to the plate.

The described construction of the reciprocating heat sealing head H is such that when the head comes down, at a predetermined time in the cycle of operation, the working faces 237' of the sealing bars 236 apply heat and pressure to the packaging material supported at the areas 34. Due to the manner in which the sealing bars 236 are mounted within the recesses 231 and the pin and slot arrangement 241, 242, the sealing bars will automatically adjust themselves vertically and radially at the point of pressure application. Furthermore, the manner in which the spring mounted sealing bars 236 are mounted in the block 230 results in resilient pressure being applied independently of each other at the zones where the package is to be sealed.

The apparatus described thus far has included a single vacuum source for both separating the plies of packaging material and evacuating the interior of the package. It is within the purview of the invention to utilize separate vacuum sources to perform the two operations in the apparatus heretofore described. As shown in Figures 20 and 21, a higher vacuum is used to hold open the plies of packaging material in the eared regions than the vacuum which actually removes the air or gases from the package. Satisfactory results have been obtained with a five (5) inch (Hg) differential between the two systems. For example, on a series of 30 packages the average evacuating period when 25-inch (Hg) vacuum was maintained on the high vacuum tank and 20-inch (Hg) vacuum was maintained in the low vacuum tank, was less than one second per package.

The vacuum circuit to hold the ears of the package open comprises a vacuum pump 301 connected to a high vacuum tank 302. The tank 302 is connected to the openings 42 and 45 in their respective grooves 41 and 44 located in the clamping members 35 and 37 of blocks 33 and jaws 36 respectively, through the pipe lines 303 and a regulating valve V.

The vacuum circuit which is designed to remove the air from within the package comprises a vacuum pump 304 connected to a vacuum tank 305. The tank 305 is connected to the openings 43 in the clamping members 35 of the blocks 33, through lines 306 and the regulating valve V.

The vacuum cam 64 which controls both vacuum circuits is mounted on the shaft 61 for rotation in proper sequence with the sealing cam and jaw activating cams. The regulating valve mechanism V is constructed to control both vacuum circuits and is actuated by a regulating plunger 310 bearing at all times against the cam 64. A stationary block 311 is provided with an inlet port 312 and an outlet port 313, which with a channel 314 in a movable block 315, serves to connect the vacuum tank 302 with the openings 42 and 45 through the pipe lines 303. The inlet port 312 is connected to the tank 302 by a pipe line 312'. The block 315 is mounted for airtight sliding engagement on the stationary block 311. A release port 316 serves to break the vacuum, holding the plies in the eared portions at openings 42 and 45, after the package has been evacuated and sealed. A duplicate set of ports 317, 318 and 319 is provided which serves, in conjunction with a channel 320 formed in the sliding block 315, to control the direction of air flow in the low vacuum circuit from the tank 305 to the openings 43 in the blocks 33 through pipe lines 306. The inlet port 317 is connected to the tank 305 by a pipe line 317'.

Fitted on or formed integrally with the stationary block 311 are extensions 321 and 322 having openings therein to journal the sliding regulating plunger 310. An extension 323 on the sliding block 315 has an opening therein through which passes the regulator plunger 310. The plunger 310 is fixed to the sliding block by means of collars 324. A helical spring 325 is disposed about the plunger 310 with one end of said spring bearing against the extension 322 and the other end against a collar 324. The helical spring 325 serves to keep the plunger 310 bearing continuously against the cam 64. The channel 314 is so designed that it will cover but two ports at one time; that is, either inlet port 312 and outlet port 313, when package evacuation is taking place, or outlet port 313 and release port 316 after evacuation and sealing have taken place. Likewise, the channel 320 is constructed so that it covers only two ports at one time; that is, either inlet port 317 and outlet port 318 when evacuating the package, or outlet port 318 and release port 319 when the evacuation and sealing operations have been completed. The length of the channel 314 is made slightly longer than the channel 320 in order that the vacuum circuit used to hold the ears of the package open is completed before the vacuum circuit for evacuating the interior of the package.

Figure 20 illustrates the positions of the ports of the valve when the jaws are in retracted position and no vacuum is being applied to either separate the plies of packaging material or to evacuate the package. Figure 21 illustrates the vacuum system when the jaws 36 are in clamping engagement and at that time in the cycle of operations when a vacuum is being applied to the packaging material to separate the plies and a vacuum is being applied to withdraw the air or gases from within the package.

Figure 22 illustrates another embodiment of the invention based upon the same principle of forming a channel in the packaging material by applying a vacuum to a clamped area of the packaging material to form a channel and applying a vacuum through the formed channel to eliminate air or gas in the package. A bag comprising heat-activatible material is filled with a food commodity to form the package C. For continuous operation the packages C are placed upon a suitable conveyor 100 which may be of the belt drive type. The filled bags are moved so that the mouths thereof pass between a pair of clamping jaws 101 and 102 each having a resilient clamping member 103 and 104, respectively. As hereinbefore described, grooves are formed in the resilient clamping members which coincide to form a channel 105 when the jaws 101 and 102 are in clamping engagement. Openings 106 and 107 are connected to a suitable vacuum source and serve to separate into channel form the plies of the packaging material in the mouth area of the bag. Clamping jaw 101 has another opening 108 connected to the same or another vacuum source. The opening 108 leads into the channel 105 formed by the grooves in the cushioning clamping surfaces 103 and 104. The opening 108, however, is located beyond the extreme edge of the packaging material when the packaging material is clamped between the jaws 101 and 102. Thus the vacuum applied through the openings 106 and 107 separate and form a channel in the packaging material coincident with the channel 105 which is completely surrounded by a gas-tight seal formed by clamping the packaging material between the covered, groove containing jaws 101 and 102. The vacuum opening 108 leads into the package and thus removes the air or gas which is present.

Below the clamping jaws 101 and 102 are a pair of sealing bars 109 and 110, at least one of which is heated. After a suitable time interval of vacuum application, the sealing bars 109 and 110 are moved together to press and heat-seal the packaging material to thereby provide a completely sealed air or gas evacuated package.

It is understood either a single or dual type of vacuum system may be utilized with the apparatus and modifications thereof herein disclosed.

The present invention may be embodied in other specific forms without departing from the essential attributes thereof. It is desired that the present specific embodiment be considered in all respects as illustrative and not restrictive, reference being had to the appended claims rather than to the aforegoing description to indicate the scope of the invention.

We claim:

1. A machine for evacuating the gases in a commodity-filled package of flexible, heat-activatible packaging material comprising a pair of clamping members for clamping in a gas-tight seal the unsealed portion of packaging material adjacent an opening of the package, a groove disposed in each of said clamping members extending from an edge of each clamping member adapted to form a channel when the clamping members are in engagement, an opening in each groove adapted to be covered by overlying portions of said packaging material, another opening in one of said grooves located beyond the packaging material and vacuum means connected to said openings to separate portions of the packaging material to form a conforming channel in the packaging material and to withdraw the gases from the package through said channel.

2. A machine for evacuating the gases in a commodity-filled package of flexible, heat-activatible packaging material comprising a pair of clamping members for clamping in a gas-tight seal the unsealed portions of packaging material adjacent an opening of the package, a groove disposed in each of said clamping members extending from an edge of each clamping member adapted to form a channel when the clamping members are in engagement, an opening in each groove adapted to be covered by overlying portions of said packaging material, another opening in one of said grooves located beyond the packaging material, vacuum means connected to said openings to separate the portions of the packaging material to form a conforming channel in the packaging material and to withdraw the gases from the package through said channel and means for heat-sealing the packaging material adjacent the clamping surfaces.

3. A machine for evacuating the gases in the commodity-filled package of flexible, heat-activatible packaging material comprising a pair of resilient clamping members for clamping in a gas-tight seal the unsealed portions of the packaging material adjacent an opening of the package, a groove disposed in each clamping member extending from an edge of each clamping member adapted to form a channel when the clamping members are in engagement, an opening in each groove adapted to be covered by overlying portions of the packaging material, another opening in one of said grooves located beyond the area of packaging material contact, heat-sealing means adapted to contact the packaging material adjacent the area of clamping, vacuum means connected to said openings to separate the portions of the packaging material to form a conforming channel in the packaging material and to withdraw the gases from the package through said channel, and means for actuating in successively timed relation first, one of the clamping members into pressing engagement with the other, secondly, the vacuum means, and thirdly, the heat-sealing means.

4. A machine for evacuating the gases in a commodity-filled package of flexible, heat-activatible packaging material comprising a pair of resilient clamping members for clamping in a gas-tight seal the unsealed portions of the packaging material adjacent an opening of the package, a groove disposed in each clamping member extending from an edge of each clamping member adapted to form a channel when the clamping members are in engagement, an opening in each groove adapted to be covered by overlying portions of the packaging material, another opening in one of said grooves located beyond the area of packaging material contact, heat-sealing means adapted to contact the packaging material adjacent the area of clamping, vacuum means connected to said openings to separate the portions of the packaging material to form a conforming channel in the packaging material and to withdraw the gases from the package through said channel, a shaft, separate cam means mounted on said shaft to successively actuate in timed relation one of the clamping members, the vacuum means and the heat-sealing means.

5. A machine for evacuating the gases in a commodity-filled package of flexible, heat-activatible packaging material comprising a pair of resilient clamping members for clamping in a gas-tight seal the unsealed portions of the packaging material adjacent an opening of the package, a groove disposed in each clamping member extending from an edge of each clamping member adapted to form a channel when the clamping members are in engagement, an opening in each groove adapted to be covered by overlying portions of the packaging material, another opening in one of said grooves located beyond the area of packaging material contact, heat-sealing means adapted to contact the packaging material adjacent the area of clamping, vacuum means connected to said openings to separate the portions of the packaging material to form a conforming channel in the packaging material and to withdraw the gases from the package through said channel, a valve mechanism intermediate said vacuum means and said openings, valve actuating means adapted to connect the vacuum means to the openings, means for actuating a clamping member and means for actuating the heat-sealing means.

6. A machine for evacuating the gases in a commodity-filled package of flexible, heat-activatible packaging material comprising a pair of resilient clamping members for clamping in a gas-tight seal the unsealed portions of the packaging material adjacent an opening of the package, a groove disposed in each clamping member extending from an edge of each clamping member adapted to form a channel when the clamping members are in engagement, an opening in each groove adapted to be covered by overlying portions of the packaging material, another opening in one of said grooves located beyond the area of packaging material contact, heat-sealing means adapted to contact the packaging material adjacent the area of clamping, vacuum means connected to said openings to separate the portions of the packaging material to form a conforming channel in the packaging material and to withdraw the gases from the package through said channel, a valve mechanism intermediate said vacuum means and said openings, a shaft, separate cams mounted on said shaft to successively actuate a clamping member, the valve mechanism and the heat-sealing means.

7. A machine for evacuating the gases in a commodity-filled package of flexible, heat-activatible packaging material completely sealed except for a pair of folded, unsealed, extended eared portions having superposed plies of packaging material the extremities of which provide openings leading into the interior of the package, comprising a pair of spaced clamping blocks for positioning the package therebetween, a resilient clamping member secured to the upper surface of each block and adapted to support an eared portion of the package, a pair of clamping jaws each having secured on the face thereof a resilient clamping member, a groove disposed in each clamping member extending from the edges of said members adjacent the package, means for moving said jaws into engagement with said blocks whereby the grooves form a pair of channels, an opening in each groove adapted to contact the adjacent packaging material, another opening in at least one of the grooves of a cooperating pair of channel forming grooves located beyond the extremities of the eared portions and vacuum means connected to said groove openings to separate the eared portions to form conforming channels in said eared portions and to withdraw the gases from the package through said channels.

8. A machine for evacuating the gases in a commodity-filled package of flexible, heat-activatible packaging material completely sealed except for a pair of folded, unsealed, extended eared portions having superposed plies of packaging material the extremities of which provide openings leading into the interior of the package, comprising a pair of spaced clamping blocks for positioning the package therebetween, a resilient clamping member secured to the upper surface of each block and adapted to support an eared portion of the package, a pair of clamping jaws each having secured on the face thereof a resilient clamping member, a groove disposed in each clamping member extending from the edges of said members adjacent the package, means for moving said jaws into engagement with said blocks whereby the grooves form a pair of channels, an opening in each groove adapted to contact the adjacent packaging material, another opening in at least one of the grooves of a cooperating pair of channel forming grooves located beyond the extremities of the eared portions, vacuum means connected to said groove openings to separate the eared portions to form conforming channels in said eared portions and to withdraw the gases from the package through said channels and a pair of heat-sealing bars adapted to seal the package across the eared portions adjacent the clamping members.

9. A machine for evacuating the gases in a commodity-filled package of flexible, heat-activatible packaging material comprising a pair of clamping members for clamping in a gas-tight seal the unsealed portions of packaging material adjacent an opening of the package, a groove disposed in each of said clamping members extending from an edge of each clamping member adapted to form a channel when the clamping members are in engagement, an opening in each groove adapted to be covered by overlying portions of said packaging material, another opening in one of said grooves located beyond the packaging material, relatively high vacuum means connected to said openings which are adapted to be covered by packaging material to separate plies thereof and form a conforming channel in the packaging material and vacuum means lower than said first named vacuum means to withdraw the gases from the package through said channel.

10. A machine for evacuating the gases in a commodity-filled package of flexible, heat-activatible packaging material comprising a pair of clamping members for clamping in a gas-tight seal the unsealed portions of packaging material adjacent an opening of the package, a groove disposed in each of said clamping members extending from an edge of each clamping member adapted to form a channel when the clamping members are in engagement, an opening in each groove adapted to be covered by overlying portions of said packaging material, another opening in one of said grooves located beyond the packaging material, relatively high vacuum means connected to said openings which are adapted to be covered by packaging material to separate plies thereof and form a conforming channel in the packaging material, vacuum means lower than said first named vacuum means to withdraw the gases from the package through said channel and means for heat-sealing the packaging material adjacent said clamping surfaces.

No references cited.